United States Patent
Lee et al.

(10) Patent No.: US 8,204,434 B2
(45) Date of Patent: Jun. 19, 2012

(54) DATA TRANSMISSION SYSTEM FOR TRANSMITTING DATA VIA RELAY HAVING MULTIPLE ANTENNAS

(75) Inventors: Namyoon Lee, Daejeon-si (KR); Young-Doo Kim, Seoul (KR); Eung Sun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 528 days.

(21) Appl. No.: 12/425,179

(22) Filed: Apr. 16, 2009

(65) Prior Publication Data

US 2010/0136903 A1 Jun. 3, 2010

(30) Foreign Application Priority Data

Nov. 28, 2008 (KR) .................. 10-2008-0119459

(51) Int. Cl.
*H04B 7/14* (2006.01)
(52) U.S. Cl. .......................................... 455/17; 455/103
(58) Field of Classification Search ................ 455/11.1, 455/12.1, 13.1, 15, 16, 17, 20, 22, 24, 73, 455/103
See application file for complete search history.

(56) References Cited

U.S. PATENT DOCUMENTS

| 6,937,878 | B2 * | 8/2005 | Kim et al. ........... 455/561 |
| 7,881,659 | B2 * | 2/2011 | Utakouji et al. .......... 455/11.1 |
| 7,995,512 | B2 * | 8/2011 | Kim et al. ........... 370/315 |
| 8,009,645 | B2 * | 8/2011 | Lee et al. ........... 370/338 |
| 8,040,826 | B2 * | 10/2011 | Lee et al. ........... 370/293 |
| 2004/0192204 | A1 | 9/2004 | Periyalwar et al. |
| 2007/0010196 | A1 | 1/2007 | Periyalwar et al. |
| 2007/0114907 | A1 | 5/2007 | Chiang et al. |
| 2010/0278096 | A1 * | 11/2010 | Wang et al. ........... 370/315 |
| 2011/0064018 | A1 * | 3/2011 | Hottinen ........... 370/315 |

FOREIGN PATENT DOCUMENTS

| JP | 2007-0067726 | 3/2007 |
| KR | 10-2007-0068824 | 7/2007 |
| KR | 10-2008-0022389 | 3/2008 |
| KR | 10-2008-0023031 | 3/2008 |
| KR | 10-2008-0070151 | 7/2008 |

* cited by examiner

*Primary Examiner* — Henry Choe
(74) *Attorney, Agent, or Firm* — NSIP Law

(57) ABSTRACT

Disclosed is a data transmission system that transmits data using a relay. During a first time slot, a base station may transmit base station data to the relay, and a mobile station may transmit mobile station data to the relay. During a second time slot, the relay may transmit the mobile station data to the base station, and transmit the base station data to the mobile station.

8 Claims, 8 Drawing Sheets

DATA TRANSMISSION SYSTEM FOR TRANSMITTING DATA VIA RELAY HAVING MULTIPLE ANTENNAS

CROSS-REFERENCE TO RELATED APPLICATION

This application claims the benefit under 35 U.S.C. §119(a) of Korean Patent Application No. 10-2008-119459, filed on Nov. 28, 2008 in the Korean Intellectual Property Office, the entire disclosure of which is incorporated herein by reference.

BACKGROUND

1. Field

The following description relates to an apparatus and method for transmitting data, and more particularly, to an apparatus for forwarding received data to a data receiving device and a data forwarding method.

2. Description of Related Art

Active studies are being made to provide various multimedia services including voice services in a radio communication environment, and support high speed and high quality data transmission. As one of the candidates, a technique in a multiple-input multiple-output (MIMO) communication system using a channel of a spatial domain has been developed.

A MIMO technique may utilize multiple antennas to increase a channel capacity in an environment with limited frequency resources, to thereby provide a relatively high data rate. The MIMO technique may utilize multiple transmitting/receiving antennas in a channel environment with a large number of scatters, and thus, in theory, may provide a channel capacity in proportion to a number of antennas of one of the transmitting/receiving antennas having a smaller number of antennas.

Also, a technique using a relay has been suggested to increase coverage of a specific base station. Mobile stations may be connected with a relay, and the relay may transmit, to the base station, data received from the mobile station.

However, where the relay is included in a communication system, radio resources such as a time duration for the relay and the like may be needed. For example, assuming that the relay between the base station and the mobile station is operated, the base station may transmit, to the relay, an A message during a T1 time section of downlink time sections, and also transmit, to the mobile station, a B message during a T2 time section of uplink time sections. In this case, the relay may transmit, to the mobile station, the A message during a T3 time section of the downlink time sections, and also transmit, to the base station, the B message during a T4 time section of the uplink time sections.

As described above, so that the A message transmitted from the base station is transmitted to the mobile station via the relay, and the B message transmitted from the mobile station is transmitted to the base station via the relay, a minimum of four time sections such as T1, T2, T3, and T4 may be needed. Where the base station and the mobile station directly transmit/receive the A and B messages without using the relay, only two time sections may be needed. Accordingly, where a relay is further included in a communication system, radio resources such as the time section and the like may be further consumed and the data rate may be reduced.

SUMMARY

Accordingly, in one general aspect, there is provided a technique to reduce consumption of radio resources, such as time sections for a relay, although the relay is included in a communication system.

According to another aspect, there is provided a relay, including a channel estimation unit to generate a first radio channel state matrix for a radio channel from a plurality of base station antennas to a plurality of relay antennas and a second radio channel state matrix for a radio channel from the plurality of relay antennas to a mobile station connected with the relay, a receiving unit to generate a receiving vector including mobile station data received from the mobile station and base station data received from a base station, the base station data being precoded in the base station based on the first and second radio channel state matrixes, a relay data generation unit to generate relay data including the mobile station data and the base station data based on the receiving vector and the second radio channel state matrix, and a transmission unit to transmit the relay data to the base station and the mobile station.

The transmission unit may transmit, to the base station, information about the first radio channel state matrix and the second radio channel state matrix.

The relay data generation unit may multiply an inverse matrix of the second radio channel state matrix by the receiving vector to obtain a product, and further multiply an inverse matrix of a Hermitian matrix of the second radio channel state matrix by the obtained product to generate the relay data.

The precoded base station data may be data generated by the base station by multiplying the second radio channel state matrix by the base station data to obtain a product, and further multiplying an inverse matrix of the first radio channel state matrix by the obtained product to precode the base station data.

The channel estimation unit may receive a base station pilot signal from the base station and generates the first radio channel state matrix using the received base station pilot signal, and receives a mobile station pilot signal from the mobile station and generates the second radio channel state matrix.

According to still another aspect, there is provided a base station, including a preceding unit to precode base station data based on a first radio channel state matrix for a radio channel from a plurality of base station antennas to a plurality of relay antennas and a second radio channel state matrix for a radio channel from the plurality of relay antennas to a mobile station connected with a relay, a transmission unit to transmit the precoded base station data to the relay using the plurality of base station antennas, a receiving unit to receive, from the relay, relay data including mobile station data transmitted from the mobile station connected with the relay, and also including the base station data, and a data extraction unit to remove the base station data from the relay data to extract the mobile station data.

The base station may further include an interference elimination unit to eliminate interference between the relay data transmitted from each of the plurality of relay antennas based on the first radio channel state matrix and the second radio channel state matrix, wherein the data extraction unit eliminates the base station data from the relay data from which the interference is eliminated.

The receiving unit may receive, from the relay, information about the first radio channel state matrix or information about the second radio channel state matrix.

The preceding unit may multiply the second radio channel state matrix by the base station data to obtain a product, and further multiply an inverse matrix of the first radio channel state matrix by the obtained product to precode the base station data.

According to yet another aspect, there is provided a method of forwarding data, the method including generating a first radio channel state matrix for a radio channel from a plurality of base station antennas to a plurality of relay antennas and a second radio channel state matrix for a radio channel from the plurality of relay antennas to a mobile station connected with a relay, generating a receiving vector including mobile station data received from the mobile station and base station data received from a base station, the base station data being precoded in the base station based on the first and second radio channel state matrixes, generating relay data including the mobile station data and the base station data based on the receiving vector and the second radio channel state matrix, and transmitting the relay data to the base station and the mobile station.

The generating of the relay data may include multiplying an inverse matrix of the second radio channel state matrix by the receiving vector to obtain a product, and further multiplying an inverse matrix of a Hermitian matrix of the second radio channel state matrix by the obtained product to generate the relay data.

The precoded base station data may be data generated by the base station by multiplying the second radio channel state matrix by the base station data to obtain a product, and further multiplying an inverse matrix of the first radio channel state matrix by the obtained product to precode the base station data.

According to still yet another aspect, there is provided a method of receiving mobile station data, the method including preceding base station data based on a first radio channel state matrix for a radio channel from a plurality of base station antennas to a plurality of relay antennas and a second radio channel state matrix for a radio channel from the plurality of relay antennas to a mobile station connected with a relay, transmitting the precoded base station data to the relay using the plurality of base station antennas, receiving, from the relay, relay data including mobile station data transmitted from the mobile station connected with the relay and the base station data, and extracting the base station data from the relay data to extract the mobile station data.

The method may further include eliminating interference between the relay data transmitted from each of the plurality of relay antennas based on the first radio channel state matrix and the second radio channel state matrix, wherein the extracting eliminates the base station data from the relay data from which the interference is eliminated.

The preceding of the base station data may include multiplying the second radio channel state matrix by the base station data to obtain a product, and further multiplying an inverse matrix of the first radio channel state matrix by the obtained product to precode the base station data.

According to still yet another aspect, there is provided a mobile station receiving base station data from a base station having a plurality of base station antennas via a relay having a plurality of relay antennas, the mobile station including a transmission unit to transmit mobile station data to the relay, a receiving unit to receive, from the relay, relay data including the mobile station data and the base station data transmitted from the base station, and a data extraction unit to eliminate the mobile station data from the relay data to extract the base station data, wherein the base station data is data precoded by the base station based on a first radio channel state matrix for a radio channel from the plurality of base station antennas to the plurality of relay antennas and a second radio channel state matrix for a radio channel from the plurality of relay antennas to the mobile station.

The base station data may be data precoded by multiplying the second radio channel state matrix by the base station data to obtain a product, and further multiplying an inverse matrix of the first radio channel state matrix by the obtained product. Other features and aspects will be apparent from the following detailed description, the drawings, and the claims.

Figure 1A:
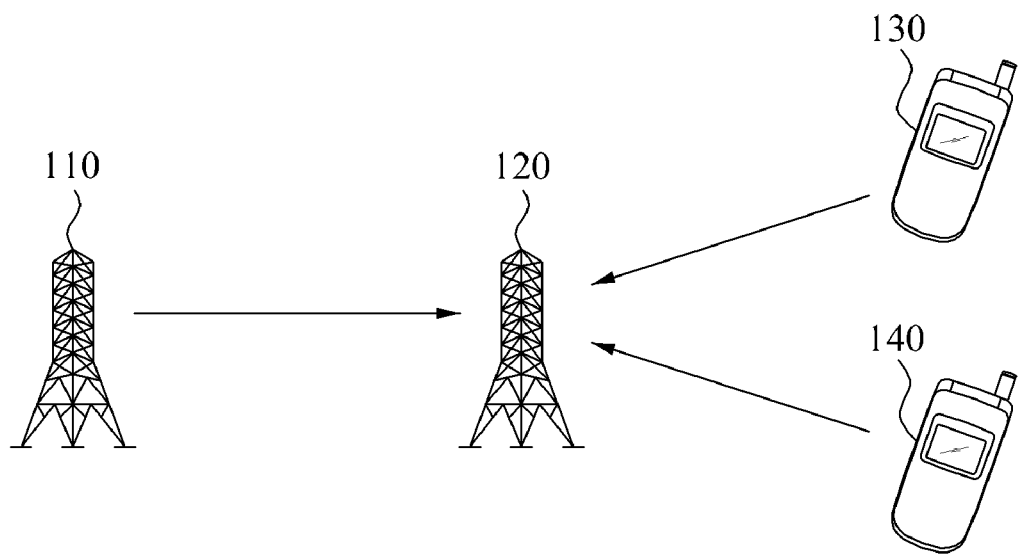
FIG. 1A and FIG. 1B are diagrams illustrating a data transmission system that transmits mobile station data from a mobile station to a base station via a relay during two time slots, respectively, according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1B:
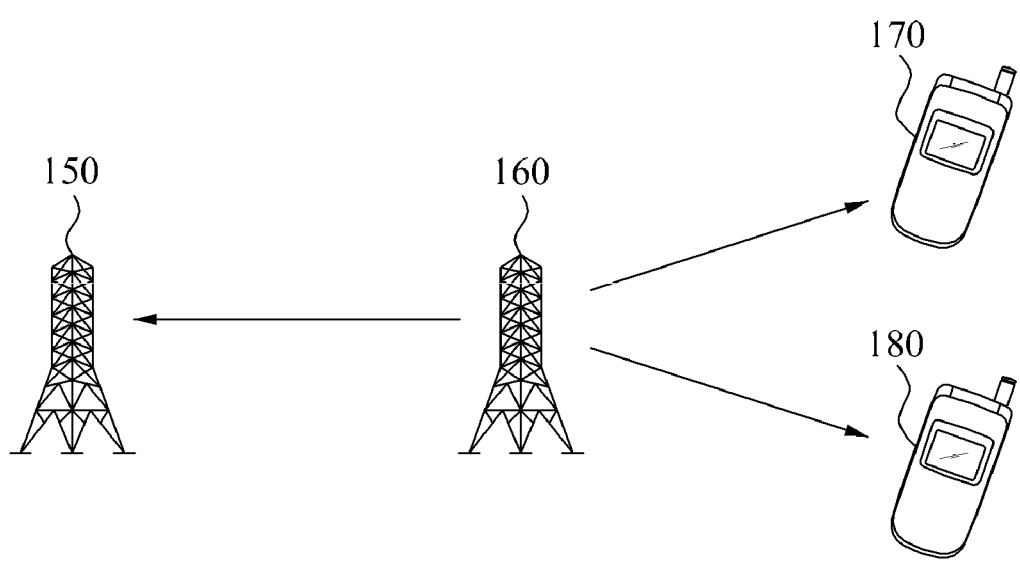

FIGS. 1A and 1B show an exemplary data transmission system that may transmit mobile station data from a mobile station to a base station via a relay during two time slots, respectively. The data transmission system includes base stations 110 and 150, relays 120 and 160, and mobile stations 130, 140, 170, and 180. As illustrated in FIG. 1A, the base station 110 and the mobile stations 130 and 140 may transmit data to the relay 120 during a first time slot.

The base station 110 may transmit base station data to the relay 120 during the first time slot. The base station 110 may precode the base station data, and transmit the precoded base station data to the relay using a plurality of base station antennas. The relay 120 may receive the precoded base station data using a plurality of relay antennas.

The mobile stations 130 and 140 may transmit mobile station data to the relay 120 during the first time slot.

As illustrated in FIG. 1B, the relay 160 may transmit data to the base station 150 and the mobile stations 170 and 180 during a second time slot.

The relay 160 may transmit relay data to the base station 150 during the second time slot. The relay data may include the base station data and the mobile station data received from the base station 110 and the mobile stations 130 and 140, respectively, during the first time slot.

The relay 160 may not acquire detailed values of the base station data and mobile station data, and merely acquire values of the relay data including the base station data and mobile station data. The base station 150 may receive the relay data. Since the base station 150 already acquires values of the base station data transmitted during the first time slot, the base station data may be eliminated from the relay data. Since only the mobile station data remains in the relay data, the base station 150 may extract the mobile station data.

The mobile stations 170 and 180 may receive the relay data. Since each of the mobile stations 170 and 180 acquires values of the mobile station data transmitted during the first time slot, the mobile station data may be eliminated from the relay data. Since only the base station data remains in the relay data, the mobile stations 170 and 180 may extract the base station data.

Figure 2:
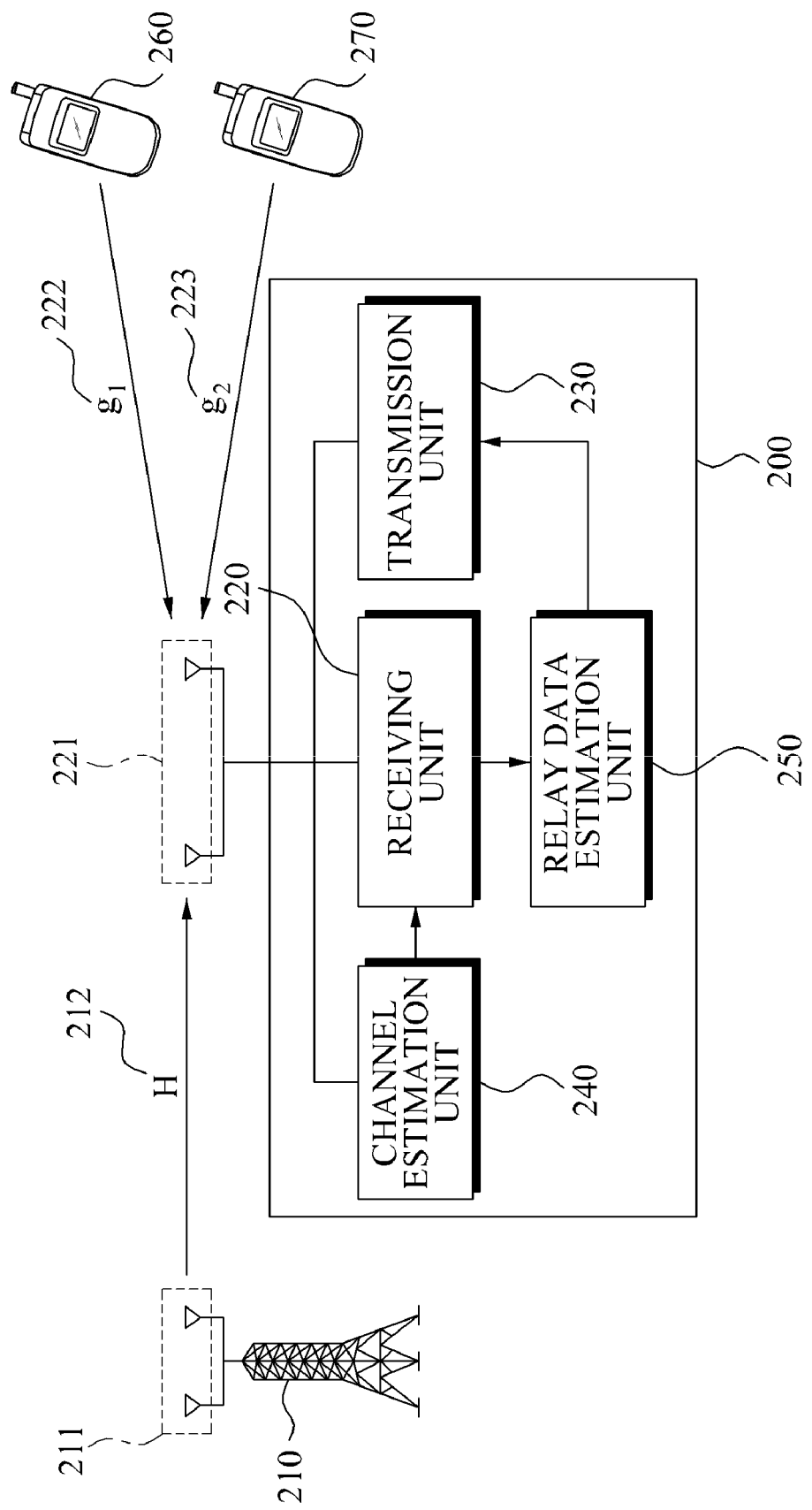
FIG. 2 is a block diagram illustrating a structure of a relay according to an exemplary embodiment.

FIG. 2 shows a structure of an exemplary relay 200. The relay 200 includes a receiving unit 220, a channel estimation unit 240, a transmission unit 230, and a relay data generation unit 250.

The channel estimation unit 240 may estimate a radio channel 212 from a plurality of base station antennas 211 to a plurality of relay antennas 221, and generate a first radio channel state matrix for the radio channel 212 according to an estimated result. Also, the channel estimation unit 240 may estimate radio channels 222 and 223 from the plurality of relay antennas 221 to mobile stations 260 and 270 connected with the relay 200, and generate a second radio channel state matrix for the radio channels 222 and 223 according to the estimated result.

Each of the mobile stations 260 and 270 may include a singular mobile station antenna. Where the relay 200 includes the plurality of the relay antennas 221, the channels 222 and 223 from the relay antennas 221 to the mobile stations 260 and 270 may be a vector channel with elements having a number of the relay antennas 221. The second radio channel state matrix may be a matrix having a channel vector for each vector channel as a column vector.

The channel estimation unit 240 may receive a base station pilot signal from the base station 210, and generate the first radio channel state matrix using the received base station pilot signal. Also, the channel estimation unit 240 may receive, from the mobile stations 260 and 270, a mobile station pilot signal, and generate the second radio channel state matrix using the received mobile station pilot signal.

The data transmission system may utilize a time division duplex (TDD) scheme. The TDD scheme may be a scheme in which the base station 210 may transmit data to the relay 200 during the first time slot, and the relay 200 may transmit data to the base station 210 during the second time slot. Frequency bands used in transmitting data by the base station 210 and the relay 200 may be the same.

Radio channels may vary depending on time and frequency. Where the base station 210 and the relay 200 use the identical frequency band, a radio channel from the base station 210 to the relay 200 and a radio channel from the relay 200 to the base station 210 may be symmetrical to each other. Accordingly, the relay 200 may also estimate the radio channel from the relay 200 to the base station 210 based on the pilot signal from the base station 210.

As an illustration only, it is assumed that the data transmission system according to an exemplary embodiment uses the TDD scheme. It is understood that other schemes may be used. For example, the data transmission system according to another exemplary embodiment may use a frequency division multiplexing (FDM) scheme. Where the data transmission system uses the FDM scheme, the base station 210 may estimate the radio channel from the relay 200 to the base station 210, and feed back information about the estimated radio channel to the relay 200. Accordingly, the relay 200 may acquire a state of the radio channel from the relay 200 to the base station 210.

The receiving unit 220 may generate a receiving vector including the mobile station data and the base station data. The mobile station data may be data received, from the mobile stations 260 and 270, by the relay 200, and the base station data may be data received, from the base station 200, by the relay 200. The base station 210 may perform precoding on the base station data and transmit the precoded base station data. In this case, the precoding may be an operation of multiplying a precoding matrix by the base station data transmitted via each of the base station antenna.

The base station 210 may generate a precoding matrix based on the first radio channel state matrix and the second radio channel state matrix.

The transmission unit 230 may transmit, to the base station 210, information about the first radio channel state matrix and second radio channel state matrix. The base station 210 may generate the precoding matrix using the first radio channel state matrix and the second radio channel state matrix.

The precoding matrix may be a product of an inverse matrix of the first radio channel state matrix and the second radio channel state matrix. For example, the base station 210 may multiply the second radio channel state matrix by the base station data to obtain a product, and further multiply the inverse matrix of the first radio channel state matrix by the obtained product to precode the base station data.

The relay data generation unit 250 may generate the relay data based on the receiving vector and the second radio channel state matrix. The relay data may include the mobile station data and the base station data.

The relay data generation unit 250 may multiply an inverse matrix of the second radio channel state matrix by the receiving vector to obtain a product, and further multiply an inverse matrix of a Hermitian matrix of the second radio channel state matrix by the obtained product to generate the relay data.

The transmission unit 230 may transmit the relay data to the base station 210 and the mobile stations 260 and 270. The base station 210 may receive the relay data, and eliminate the base station data from the relay data. Since only the mobile station data remains in the relay data, the base station 210 may easily extract the mobile station data.

The mobile stations 260 and 270 may receive the relay data, and extract the base station data.

Figure 3:
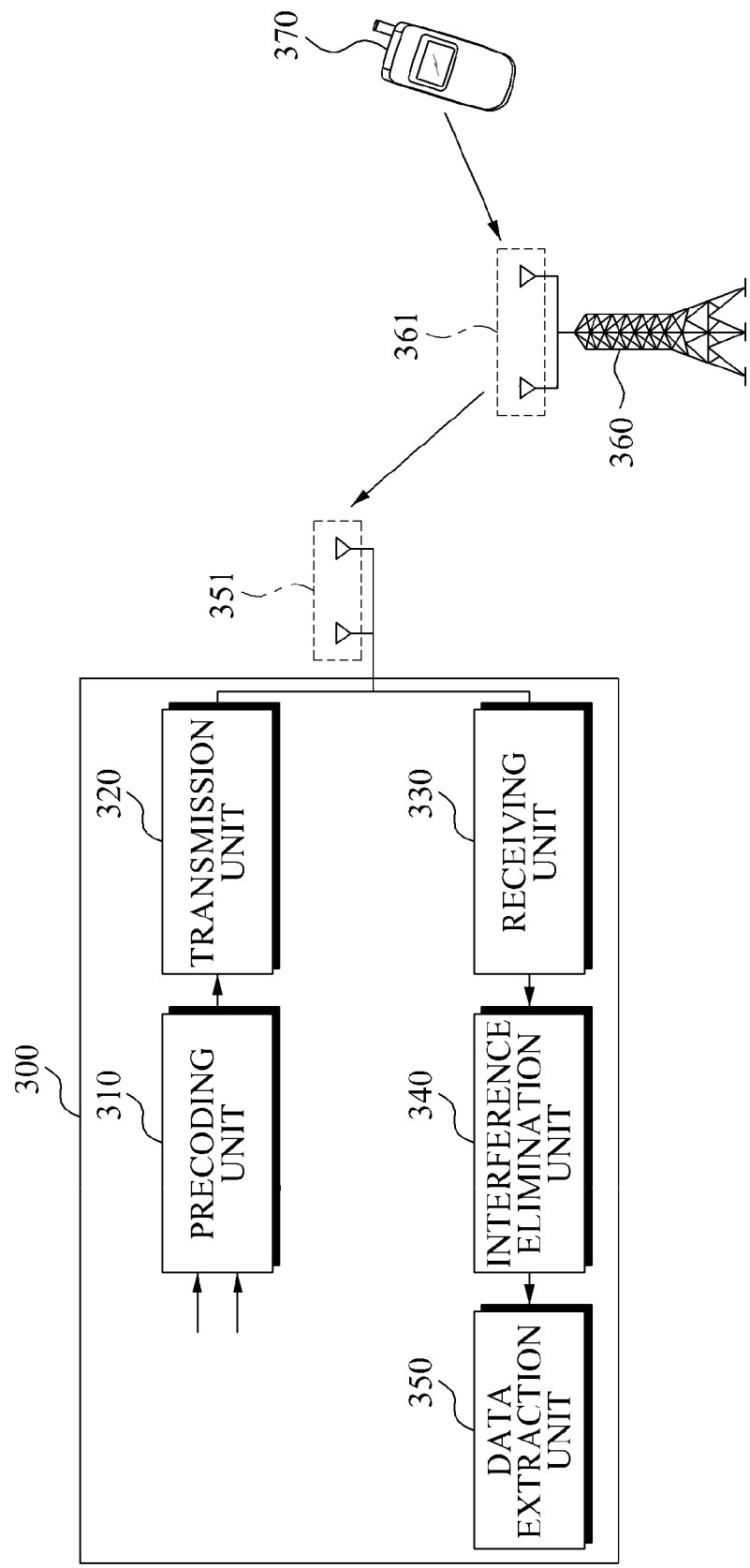
FIG. 3 is a block diagram illustrating a structure of a base station according to an exemplary embodiment.

FIG. 3 shows a structure of an exemplary base station 300. The base station 300 includes a precoding unit 310, a transmission unit 320, a receiving unit 330, an interference elimination unit 340, and a data extraction unit 350.

The precoding unit 310 may precode base station data. In this case, the precoding may be an operation of multiplying a precoding matrix by the base station data transmitted via each of the base station antenna. The base station 300 may generate the precoding matrix based on a first radio channel state matrix and a second radio channel state matrix. The first radio channel state matrix may be a radio channel state matrix with respect to a radio channel from a plurality of base station antennas 351 to a plurality of relay antennas 361, and the second radio channel state matrix may be a radio channel state matrix with respect to a radio channel from the plurality of relay antennas 361 to a mobile station 370 connected with a relay 360.

The preceding unit 310 may multiply the second radio channel state matrix by the base station data to obtain a product, and further multiply an inverse matrix of the first radio channel state matrix by the obtained product to precode the base station data.

The receiving unit 330 may receive, from the relay 360, information about the first radio channel state matrix or information about the second radio channel state matrix, and the preceding unit 310 may generate the first radio channel state matrix based on the information about the first radio channel state matrix, or generate the second radio channel state matrix based on the information about the second radio channel state matrix.

The transmission unit 320 may transmit, to the relay 360, the precoded base station data using the plurality of base station antennas 351 during a first time slot.

The receiving unit 330 may receive, from the relay 360, relay data during a second time slot. The relay data may include the base station data and mobile station data. The base station data included in the relay data may be data identical to the base station data that is transmitted to the relay 360 by the base station 300 during the first time slot. The mobile station data included in the relay data may be data identical to the mobile station data that is transmitted to the relay 360 by the mobile station 370, connected with the relay 360, during the first time slot.

The data extracting unit 350 may eliminate the base station data from the relay to extract the mobile station data. Since the base station data included in the relay data is data identical to data that is transmitted to the relay 360 by the base station 300 during the first time slot, the data extraction unit 350 may eliminate the base station data from the relay data. Since only the mobile station data remains in the relay data from which the base station data is eliminated, the data extraction unit 350 may easily extract the mobile station data from the relay data.

The relay 360 may transmit the relay data using the plurality of relay antennas 361. Interferences between the relay data transmitted via each of the plurality of relay antennas 361 may occur.

The interference elimination unit 340 may eliminate the interferences occurring between the relay data transmitted from each of the plurality of relay antennas 361, and the data extraction unit 350 may eliminate the base station data from the relay data from which interferences are eliminated. The interference elimination unit 340 may eliminate the interferences occurring between the relay data transmitted from each of the plurality of relay antennas 361 based on the first radio channel state matrix and the second radio channel state matrix.

Figure 4:
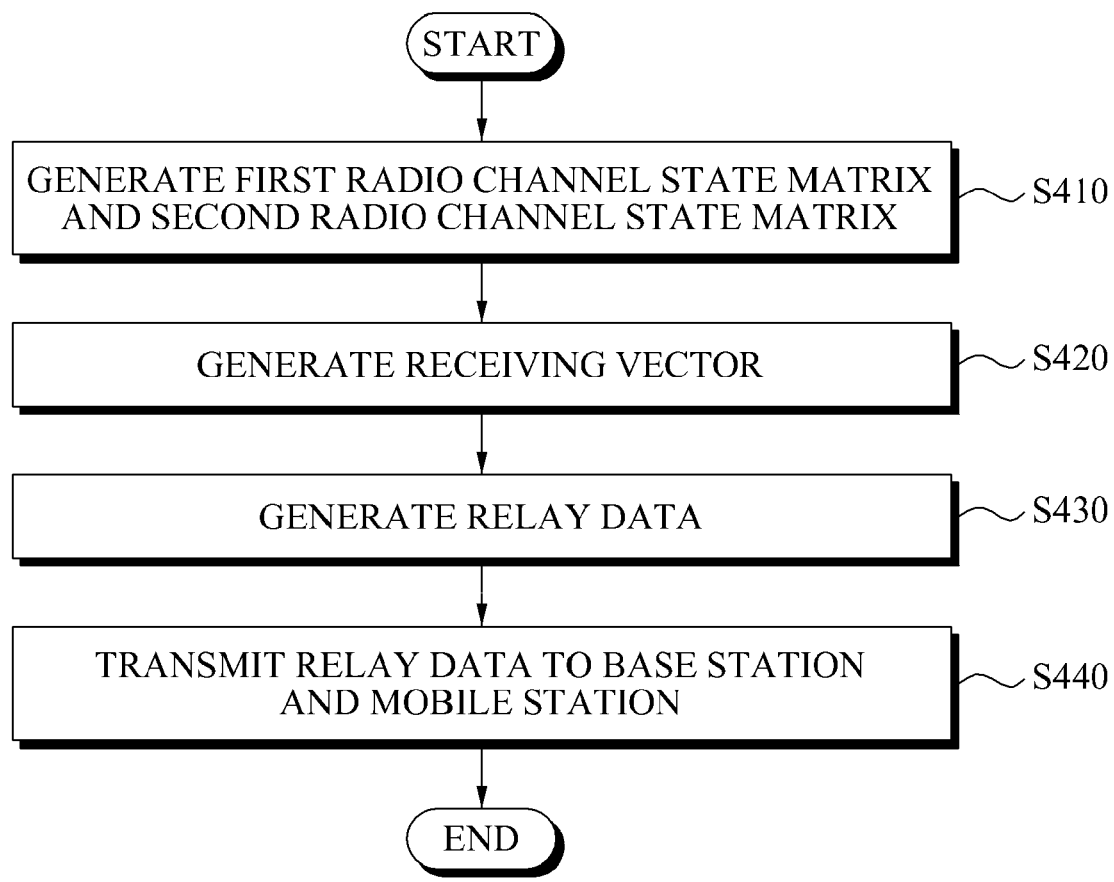
FIG. 4 is a flowchart illustrating a method of forwarding data according to an exemplary embodiment.

FIG. 4 illustrates an exemplary method of forwarding data.

In operation S410, a relay generates a first radio channel state matrix and a second radio channel state matrix. The first radio channel state matrix may be a radio channel state matrix for a radio channel from a plurality of base station antennas to a plurality of relay antennas, and a second radio channel state matrix may be a radio channel state matrix for a radio channel from the plurality of relay antennas to a mobile station connected with the relay.

In operation S420, the relay generates a receiving vector including base station data and mobile station data. The mobile station data may be data that is received by the relay from the mobile station connected with the relay. Also, the base station data may be data that is received by the relay from the base station, that is, data precoded in the base station based on the first radio channel state matrix and the second radio channel state matrix.

The base station may multiply the second radio channel state matrix by the base station data to obtain a product, and further multiply an inverse matrix of the first radio channel state matrix by the obtained product to precode the base station data.

In operation S430, the relay generates the relay data based on the receiving vector and the second radio channel state matrix. The relay data may include the mobile station data and the base station data.

In the operation S430, the relay may multiply an inverse matrix of the second radio channel state matrix by the receiving vector to obtain a product, and further multiply an inverse matrix of a Hermitian matrix of the second radio channel state matrix by the obtained product to generate the relay data.

In operation S440, the relay transmits the relay data to the base station and the mobile station.

The base station may eliminate the base station data from the relay data to extract the mobile station data. The mobile station may eliminate the mobile station data from the relay data to extract the base station data.

Figure 5:
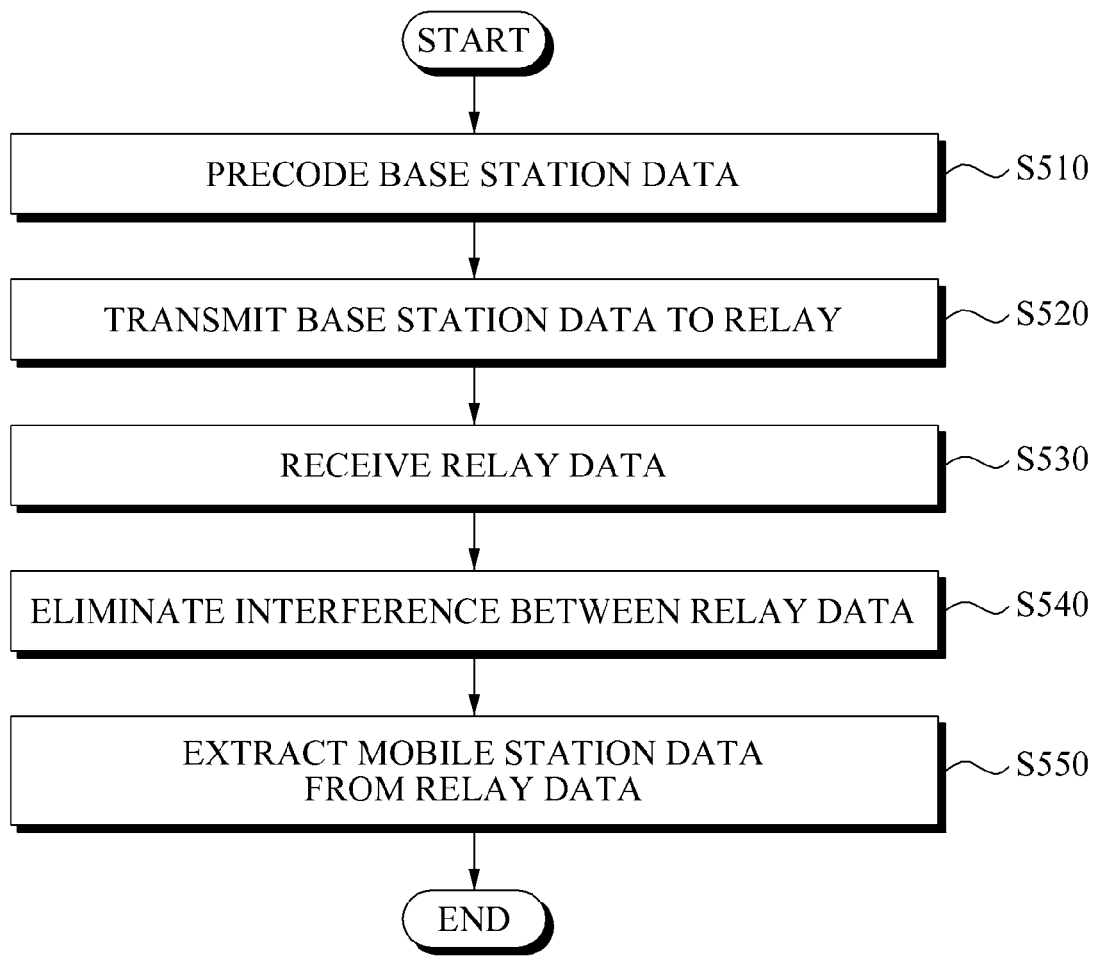
FIG. 5 is a flowchart illustrating a method of receiving data according to an exemplary embodiment.

FIG. 5 illustrates an exemplary method of receiving data.

In operation S510, a base station precodes base station data based on a first radio channel state matrix and a second radio channel state matrix. The first radio channel state matrix may be a radio channel state matrix for a radio channel from a plurality of base station antennas to a plurality of relay antennas, and the second radio channel state matrix may be a radio channel state matrix for a radio channel from the plurality of relay antennas to a mobile station connected with a relay.

The base station may multiply the second radio channel state matrix by the base station data to obtain a product, and further multiply an inverse matrix of the first radio channel state matrix by the obtained product to precode the base station data.

In operation S520, the base station transmits, to the relay, the precoded base station data using the plurality of base station antennas.

In operation S530, the base station receives relay data from the relay. The relay data may include mobile station data received from the mobile station and the base station data received from the base station.

In operation S550, the base station eliminates the base station data from the relay data to extract the mobile station data. Since the base station data included in the relay data may be data identical to the base station data that is transmitted to the relay by the base station, the base station may eliminate the base station data from the relay data. Since only the mobile station data remains in the relay data from which the base station data is eliminated, the base station may easily extract the mobile station data.

Similarly, the mobile station may extract the base station data from the relay data.

The relay may transmit the relay data using a plurality of relay antennas. Interferences between the relay data transmitted via each of the plurality of relay antennas may occur.

In operation S540, the base station may eliminate the interferences between the relay data transmitted from each of the plurality of relay antennas, and in the operation S550, the base station may eliminate the base station data from the relay data from which the interferences are eliminated. In the operation S540, the base station may eliminate the interferences between the relay data transmitted from each of the plurality of relay antennas based on the first radio channel state matrix and the second radio channel state matrix.

Figure 6:
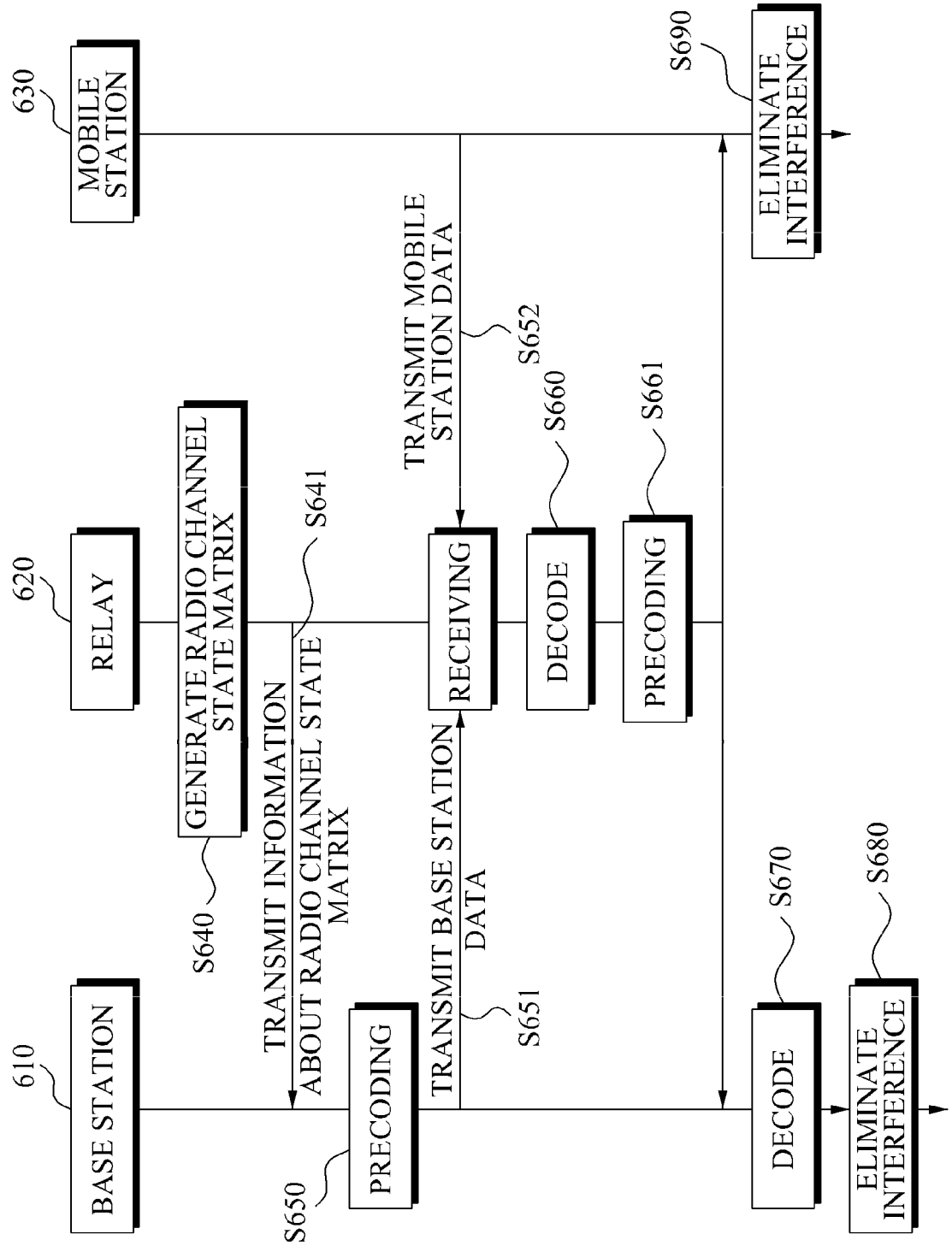
FIG. 6 is a flowchart illustrating a data transmission method in which a relay decodes data, according to an exemplary embodiment.

FIG. 6 illustrates an exemplary data transmission method in which a relay 620 may decode data.

In operation S640, the relay 620 generates a first radio channel state matrix and a second radio channel state matrix. The first radio channel state matrix may be a radio channel state matrix for a radio channel from a plurality of base station antennas to a plurality of relay antennas, and the second radio channel state matrix may be a radio channel state matrix for a radio channel from the plurality of relay antennas to a mobile station. The first radio channel state matrix may be designated as H, and the second radio channel state matrix may be designated as G.

In operation S641, the relay 620 transmits, to a base station 610 or a mobile station 630, information about the first radio channel state matrix H or information about the second radio channel state matrix G. The base station 610 or the mobile station 630 may reconfigure a radio channel state matrix generated by the relay 620 based on the information about the radio channel state matrix.

In operation S650, the base station 610 performs precoding on base station data. In this case, the precoding may be an operation of multiplying a precoding matrix by the base station data transmitted via each of the base station antenna. A precoding matrix of the base station 610 may be designated as F.

In operation S651, the base station transmits the precoded base station data to the relay 620, and in operation S652, the mobile station 630 transmits the mobile station data to the relay 620. The relay 620 may receive the base station data and the mobile station data to generate a receiving vector including the base station data and the mobile station data. The receiving vector generated by the relay 620 may be represented by $$r_{RS} = H \cdot F \cdot s + G \cdot u + n_{RS},$$ [Equation 1]

wherein $r_{RS}$ represents a receiving vector generated by the relay 620, s represents base station data, u represents mobile station data, and $n_{RS}$ represents a thermal noise vector in a data receiving process. F·s represents precoded base station data.

In operation S660, the relay 620 multiplies a decoding matrix W by the receiving vector $r_{RS}$ to decode the receiving vector.

The base station 620 may determine a preceding matrix as shown in $$F = \{G^{-1} \cdot H\}^{-1}.$$ [Equation 2]

Also, the relay 620 may determine the decoding matrix W as shown in $$W = G^{-1}.$$ [Equation 3]

Referring to the Equations 2 and 3, a decoding vector $d_{RS}$ generated by multiplying the decoding matrix W by the receiving vector $r_{RS}$ may be represented as $$\begin{aligned} d_{RS} &= W \cdot r_{RS} \\ &= W \cdot (H \cdot F \cdot s + G \cdot u + n_{RS}) \\ &= s + u + \tilde{n}_{RS}, \end{aligned}$$ [Equation 4]

wherein $\tilde{n}_{RS}$ represents a product of the decoding matrix W and the thermal noise vector $n_{RS}$.

The relay 620 may transmit the decoding vector $d_{RS}$ to the base station 610 and the mobile station 630. The relay 620 may precode the decoding vector $d_{RS}$, and transmit the precoded decoding vector $d_{RS}$ to the base station 610 and the mobile station 630. The relay 620 may multiply a relay precoding matrix T by the decoding vector $d_{RS}$ to precode the decoding vector $d_{RS}$.

In operation S670, the base station 610 receives the precoded decoding vector $d_{RS}$ from the relay 620 to generate a base station receiving vector $r_{BS}$. Referring to the above Equations, the base station receiving vector $r_{BS}$ received from the relay by the base station 610 may be represented as $$r_{BS} = H^H \cdot T \cdot d_{RS} + n_{BS},$$ [Equation 5]

wherein $n_{BS}$ represents the thermal noise vector in the data receiving process.

The base station 610 may decode the base station receiving vector $r_{BS}$.

The base station 610 may multiply a base station decoding matrix D by the base station receiving vector $r_{BS}$ to generate a base station decoding vector $d_{BS}$.

The base station decoding vector $d_{BS}$ may be represented as $$d_{BS} = D \cdot r_{BS}.$$ [Equation 6]

The relay 620 may determine the relay precoding matrix T according to Equation 7 below, and the base station 610 may determine the base station decoding matrix D according to Equation 8 below.

$$T = \{G^H\}^{-1}.$$ [Equation 7]

$$D = \{H^H \cdot T\}^{-1}.$$ [Equation 8]

Referring to the Equations 7 and 8, the base station decoding vector $d_{BS}$ may be represented as $$\begin{aligned} d_{BS} &= D \cdot \{H^H \cdot T \cdot d_{RS} + n_{BS}\} \\ &= d_{RS} + \tilde{n}_{BS}, \end{aligned}$$ [Equation 9]

wherein $\tilde{n}_{BS}$ represents a product of the base station decoding matrix D and the thermal noise vector $n_{BS}$.

The base station decoding vector $d_{BS}$ may include the base station data s and the mobile station data u. In operation S680, since the base station data s is already acquired, the base station 610 may eliminate the base station data s from the base station decoding vector $d_{BS}$ to extract the mobile station data u.

In operation S690, the mobile station 630 receives the precoded decoding vector $d_{RS}$ from the relay 620 to generate a mobile station receiving vector $r_{MS}$. Referring to the above Equations, the mobile station receiving vector $r_{MS}$ received from the relay 620 by the mobile station 630 may be represented as $$r_{MS} = G^H \cdot T \cdot d_{RS} + n_{MS},$$ [Equation 10]

wherein $n_{MS}$ represents the thermal noise vector.

Where the relay 620 determines the relay precoding matrix T as shown in the Equation 7 above, the mobile station receiving vector $r_{MS}$ may be again represented as $$r_{MS} = d_{RS} + n_{MS}.$$ [Equation 11]

The mobile station receiving vector $r_{MS}$ may include the base station data s and the mobile station data u. In operation S690, since the mobile station data u is already acquired, the mobile station 630 may eliminate the mobile station data u from the mobile station receiving vector $r_{MS}$ to extract the base station data s.

Figure 7:
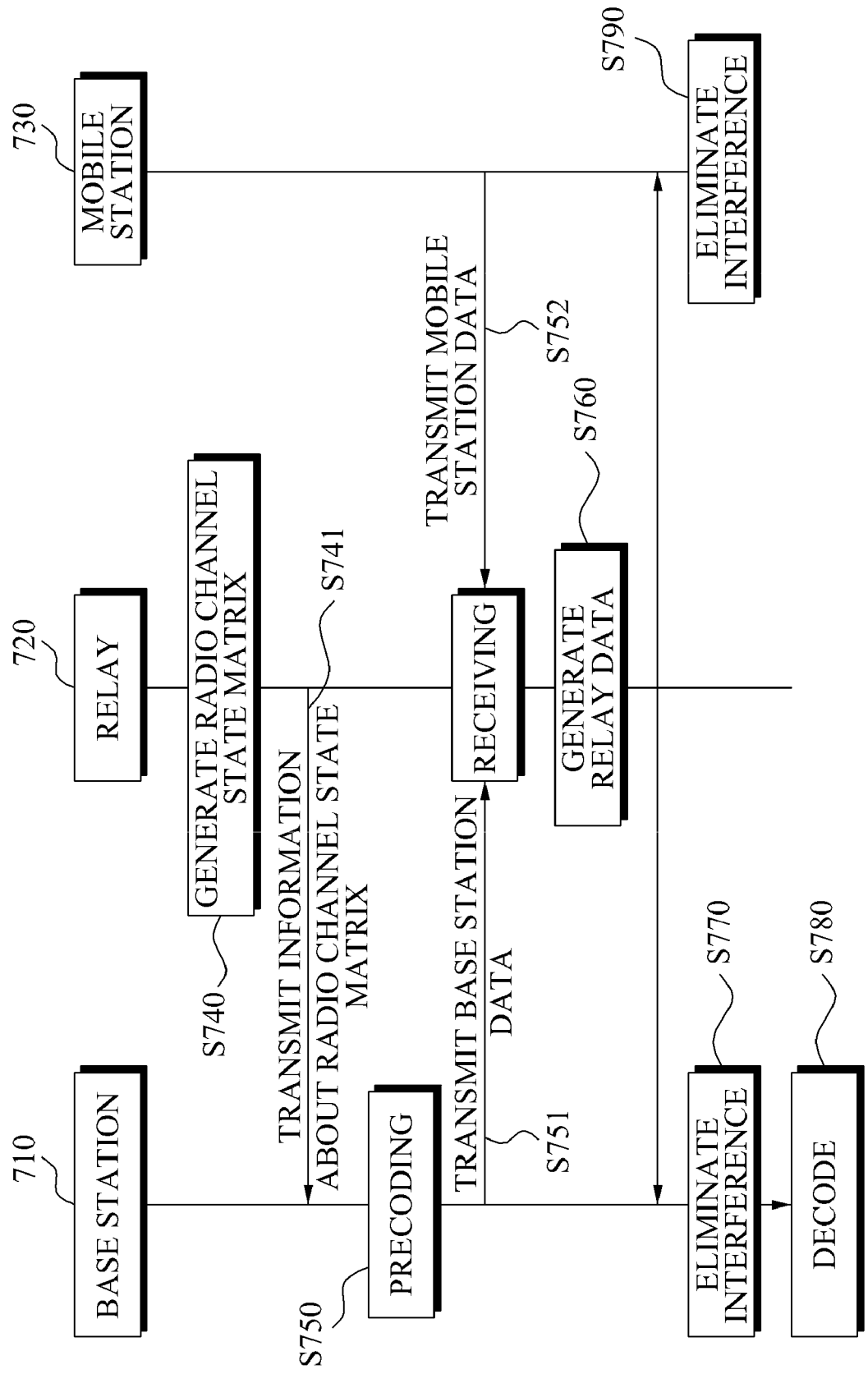
FIG. 7 is a flowchart illustrating a data transmission method in which a relay does not decode data, according to an exemplary embodiment.

FIG. 7 illustrates an exemplary data transmission method in which a relay 720 may not decode.

Operations S740 to S752 of FIG. 7 are similar to the operations S640 to S652 of FIG. 6, and thus detailed descriptions of the operations S740 to S752 will be omitted herein.

In operation S760, the relay 720 multiplies the decoding matrix W by the receiving vector $r_{RS}$ to generate relay data $X_{RS}$. The relay data $X_{RS}$ may be represented as $$X_{RS} = W \cdot r_{RS} \qquad \text{[Equation 12]}$$
$$= W \cdot (H \cdot F \cdot s + G \cdot u + n_{RS}).$$

The relay 720 may transmit the relay data $X_{RS}$ to a base station 710 and a mobile station 730.

In operation S770, the base station 710 receives the relay data $X_{RS}$ to generate the base station receiving vector $r_{BS}$. Referring to the above Equations, the base station receiving vector $r_{BS}$ may be represented as $$r_{BS} = H^H \cdot X_{RS} \qquad \text{[Equation 13]}$$
$$= H^H \cdot W \cdot H \cdot F \cdot s + H^H \cdot W \cdot G \cdot u + n_{BS}.$$

The base station 710 may eliminate elements of $H^H \cdot W \cdot H \cdot F \cdot s$ from the base station receiving vector $r_{BS}$ using information about the first radio channel state matrix H, information about the second radio channel state matrix G, and information about the base station data s.

Since only elements concerning the mobile station data u remain in the base station receiving vector $r_{BS}$, the base station 710 may extract the mobile station data u from the base station receiving vector $r_{BS}$.

In operation S780, the base station 710 multiplies the base station decoding matrix D by base station receiving vector $r_{BS}$ to extract the mobile station data u.

In operation S790, the mobile station 730 receives the relay data $X_{RS}$ to generate the mobile station receiving vector $r_{MS}$. Referring to the above Equations, the mobile station receiving vector $r_{MS}$ may be represented as $$r_{MS} = G^H \cdot X_{RS} \qquad \text{[Equation 14]}$$
$$= G^H \cdot W \cdot H \cdot F \cdot s + G^H \cdot W \cdot G \cdot u + n_{MS}.$$

The mobile station 730 may eliminate elements of $G^H \cdot W \cdot G \cdot u$ from the mobile station receiving vector $r_{MS}$ using information about the first radio channel state matrix H, information about the second radio channel state matrix G, and information about the mobile station data u.

Since only elements concerning the base station data s remain in the mobile station receiving vector $r_{MS}$, the base station 710 may extract the base station data s from the mobile station receiving vector $r_{MS}$.

The decoding matrix W, the preceding matrix F, and the base station decoding matrix D may be determined so that a difference between the mobile station data extracted by the base station 710 and the mobile station data transmitted by the mobile station 730 is minimized.

Also, the decoding matrix W, the preceding matrix F, and the base station decoding matrix D may be determined so that a difference between the base station data extracted by the mobile station 730 and the base station data transmitted by the base station 710 is minimized.

Figure 8:
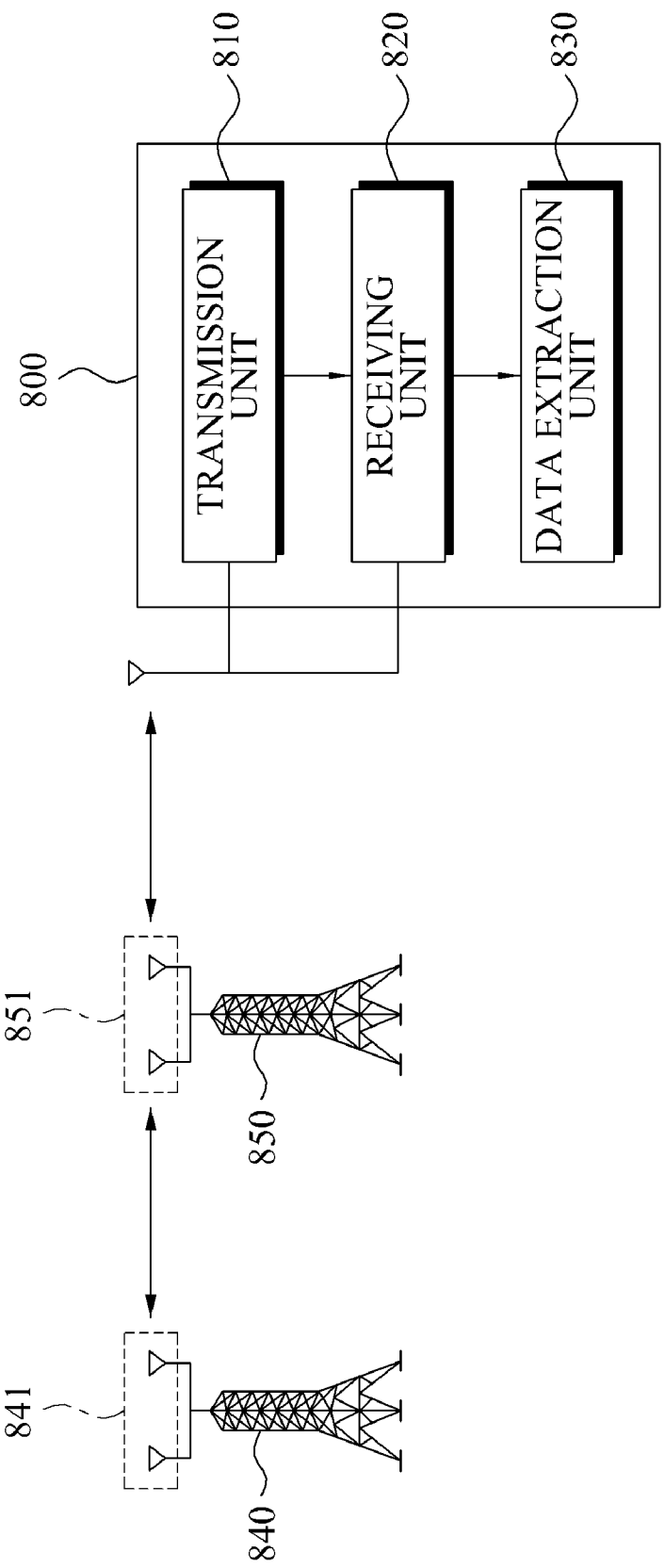
FIG. 8 is a block diagram illustrating a structure of a mobile station receiving data from a relay according to an exemplary embodiment.

FIG. 8 shows a structure of an exemplary mobile station 800 receiving data from a relay 850. The mobile station 800 includes a transmission unit 810, a receiving unit 820, and a data extraction unit 830.

The mobile station 800 may receive, from a base station 840, base station data via the relay 850. The base station 840 may include a plurality of base station antennas 841, and the relay 850 may include a plurality of relay antennas 851. Accordingly, a radio channel from the plurality of base station antennas 841 to the plurality of relay antennas 851 may be represented as a matrix. The base station 840 or the relay 850 may estimate the radio channel from the plurality of base station antennas 841 to the plurality of relay antennas 851 to generate a first radio channel state matrix.

The mobile station 800 may receive base station data using a mobile station antenna. A channel from the plurality of relay antennas 851 to the mobile station may be represented as a vector or a matrix depending on a number of the mobile station antennas. The base station 840 or the relay 850 may estimate the radio channel from the plurality of relay antennas 851 to the mobile station 800 to generate a second radio channel state matrix.

The transmission unit 810 may transmit mobile station data to the relay 850. Also, the base station 840 may transmit the base station data to the relay 850. The relay 850 may generate the relay data including the mobile station data and the base station data.

The base station 840 may multiply the second radio channel state matrix by the base station data to obtain a product, and further multiply an inverse of the first radio channel state matrix by the obtained product to precode the base station data. The base station 840 may precode the base station data based on a state of the radio channel from the plurality of base station antennas 841 to the plurality of relay antennas 851 and a state of the radio channel from the plurality of relay antennas 851 to the mobile station 800. Accordingly, the base station data may be transmitted so that each of the radio channels has optimum efficiency.

The receiving unit 820 may receive the relay data from the relay 840.

The data extraction unit 830 may eliminate the mobile station data from the relay data to extract the base station data. The mobile station data included in the relay data may be data transmitted from the transmission unit 810 to the relay 850, which is already acquired by the data extraction unit 830. Accordingly, the data extraction unit 830 may easily eliminate the mobile station data from the relay data.

The methods described above including a method of forwarding data may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

According certain embodiments described above, a relay and base station may transmit data to a mobile station via the relay during two time slots, and receive data from the mobile station via the relay.

According certain embodiments described above, a relay and base station may eliminate interference between signals transmitted using each antenna. Accordingly, data transmission efficiency may be improved.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A relay comprising:
a channel estimation unit configured to generate a first radio channel state matrix for a radio channel from a plurality of base station antennas to a plurality of relay antennas and a second radio channel state matrix for a radio channel from the plurality of relay antennas to a mobile station connected with the relay;
a receiving unit configured to generate a receiving vector including mobile station data received from the mobile station and base station data received from the base station, the base station data being precoded in a base station based on the first and second radio channel state matrixes;
a relay data generation unit configured to generate relay data including the mobile station data and the base station data based on the receiving vector and the second radio channel state matrix; and
a transmission unit configured to transmit the relay data to the base station and the mobile station.

2. The relay of claim 1, wherein the transmission unit transmits, to the base station, information about the first radio channel state matrix and the second radio channel state matrix.

3. The relay of claim 1, wherein the relay data generation unit multiplies an inverse matrix of the second radio channel state matrix by the receiving vector to obtain a product, and further multiplies an inverse matrix of a Hermitian matrix of the second radio channel state matrix by the obtained product to generate the relay data.

4. The relay of claim 1, wherein the receiving unit multiplies the second radio channel state matrix by the base station data to obtain a product, and further multiplies an inverse matrix of the first radio channel state matrix by the obtained product to receive the precoded base station data.

5. The relay of claim 1, wherein the channel estimation unit receives a base station pilot signal from the base station and generates the first radio channel state matrix using the received base station pilot signal, and also the channel estimation unit receives a mobile station pilot signal from the mobile station and generates the second radio channel state matrix.

6. A method of forwarding data, the method comprising:
generating a first radio channel state matrix for a radio channel from a plurality of base station antennas to a plurality of relay antennas and a second radio channel state matrix for a radio channel from the plurality of relay antennas to a mobile station connected with a relay;
generating a receiving vector including mobile station data received from the mobile station and base station data received from the base station, the base station data being precoded in a base station based on the first and second radio channel state matrixes;
generating relay data including the mobile station data and the base station data based on the receiving vector and the second radio channel state matrix; and
transmitting the relay data to the base station and the mobile station.

7. The method of claim 6, wherein the transmitting multiplies an inverse matrix of the second radio channel state matrix by the receiving vector to obtain a product, and further multiplies an inverse matrix of a Hermitian matrix of the second radio channel state matrix by the obtained product to generate the relay data.

8. The method of claim 6, wherein the receiving multiplies the second radio channel state matrix by the base station data to obtain a product, and further multiplies an inverse matrix of the first radio channel state matrix by the obtained product to receive the precoded base station data.

* * * * *